United States Patent [19]

Jones

[11] Patent Number: 5,003,579
[45] Date of Patent: * Mar. 26, 1991

[54] SYSTEM FOR CONNECTING COMPUTERS VIA TELEPHONE LINES

[75] Inventor: Reese M. Jones, Berkeley, Calif.

[73] Assignee: Farallon Computing, Incorporated, Emeryville, Calif.

[*] Notice: The portion of the term of this patent subsequent to Feb. 13, 2007 has been disclaimed.

[21] Appl. No.: 404,152

[22] Filed: Sep. 7, 1989

Related U.S. Application Data

[60] Division of Ser. No. 267,759, Oct. 27, 1988, Pat. No. 4,901,342, and a continuation of Ser. No. 899,413, Aug. 22, 1986, abandoned.

[51] Int. Cl.$^5$ ............................................ H04M 11/00
[52] U.S. Cl. ........................................ 379/93; 375/36; 375/60; 361/119
[58] Field of Search ................. 379/93, 412, 416, 442; 375/36, 60, 99; 361/119

[56] References Cited

U.S. PATENT DOCUMENTS

| | | | |
|---|---|---|---|
| 3,383,600 | 5/1968 | Calfee | 375/99 X |
| 4,332,980 | 6/1982 | Reynolds et al. | |
| 4,586,104 | 4/1986 | Standler | 361/119 X |
| 4,751,607 | 6/1988 | Smith | 379/416 X |
| 4,764,939 | 8/1988 | Rogers | 375/36 X |

OTHER PUBLICATIONS

William Ross, "Making the Data Connection with Twisted-Pair Cable", *Telecommunications*, vol. 20, No. 9, Sep. 1986, pp. 154, 156, 158, 160.

*Primary Examiner*—Jin F. Ng
*Assistant Examiner*—Wing F. Chan
*Attorney, Agent, or Firm*—Skjerven, Morrill, MacPherson, Franklin & Friel

[57] ABSTRACT

A system for connecting a plurality of computers and computer peripherals into a network using two unshielded lines of the type included in a telephone cable. A floating ground isolation circuit is used to aid suppression of non-zero static voltages and voltage surges.

20 Claims, 5 Drawing Sheets

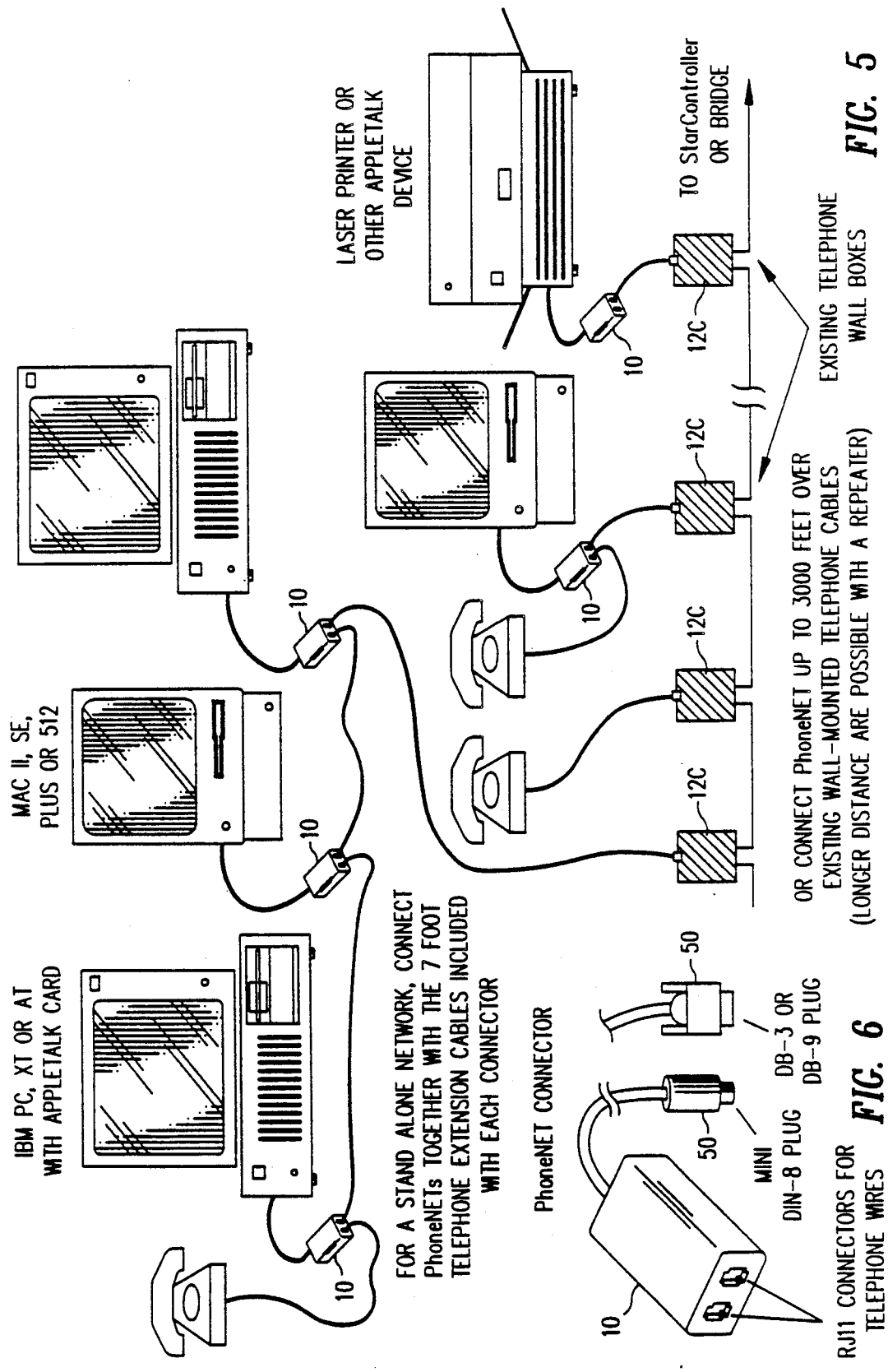

SYSTEM FOR CONNECTING COMPUTERS VIA TELEPHONE LINES

CROSS-REFERENCE TO RELATED APPLICATION

This application is a division of U.S. Ser. No. 07/267,759, filed Oct. 27, 1988, which application is a continuation of U.S. Pat. application Ser. No. 06/899,413, filed Aug. 22, 1986, abandoned.

FIELD OF THE INVENTION

This invention relates to microcomputer local area networks (LAN's) and modular coupling components thereof and more particularly to a LAN permitting the coupling or connection together of computers and their peripherals through the use of common telephone lines which are unshielded multi-wire cables via modular connectors and jacks.

BACKGROUND OF THE INVENTION

In the past, it was thought that local area networks for connecting or interconnecting terminals, computers, and peripheral devices such as printers or disc drives over relatively long distances required dedicated shielded cable and amplifiers such that, without such devices, wire runs of only 25-50 feet would reliably permit sufficient signal quality for the transmission of information, whether or not at relatively high data rates. Computers and their peripherals including personal computers manufactured by IBM ®, Apple Computer, Inc., e.g. the Macintosh TM and Macintosh-Plus TM computers and related hard disk drive and laser printer peripherals were and are networked via specialized connector units and cables provided e.g., by Apple Computer, Inc. These connectors require networks, in a given local use area, to be run over separate shielded cables and to "daisy-chain" the devices to be connected together Daisy-chaining refers to the serial connection of devices on the same cable, a party line. Breaking the daisy chain at one link, for example by removing one computer or peripheral and its connector from the line, prevents devices on one side of the break from communicating (through that chain) with devices on the other side of the break and may prevent all devices in that daisy chain from communicating with any other device in the network. For operation of multiple computers sharing the same cables for communication some kind of polling or token passing protocol is required in order that the information can be transmitted, received and properly validated in the presence of other incoming and outgoing signals on the same line. Several network transmission protocols exist allowing multiple computers to communicate over a common signal carrier, a party line.

Interconnect systems for computers and their peripherals (herein cumulatively referred to as "computer products") require the ability to connect together the computer products to allow each to transfer data such as programs, files, mail, etc., from one machine to the next in a convenient manner. The data transfers are made between different types of computers with the aid of a standard file protocol for the network so that, for instance, a Macintosh ® computer and an IBM ® PC can easily share data given the right software for the network. In the past, Apple Computer, Inc. had developed its "Apple Talk" TM brand network, which allowed several computer products to share expensive or infrequently used peripherals such as modems, printers and mass storage devices. For instance, sharing one laser printer among several microcomputers is one of the most common usages for the Apple Talk connector network. Other uses for the network include electronic mail, sharing or transferring files, and operation of or sharing mass storage devices and other peripherals.

In the past, if one were to transfer data between only two machines, one would simply utilize a compatible cable to plug the serial port of machines together and utilize specially designed serial communication programs such as Mock terminal TM or Fee Term TM to transfer the files from one machine to the next through the cable. If one wanted to connect more than two computer products, it was common practice to daisy-chain them with more cables and the use of Y adapters. One could even transfer data between any two computers assuming that only one computer was sending and the receiver was ready to receive the data, and assuming that no other transmission was already occurring on the line. State of the art systems, such as the Apple Talk system with its software protocol and its specialized cabling, keeps messages separate and makes sure they are delivered to the intended receiver and that the messages between devices do not interfere. Such systems utilize a transformer to electrically isolate each computer from the signal wires running between the various computers on the network while still allowing each computer to send and receive data over the wires. The rest of the transmission and reception screening protocol is embodied in executable software code.

A major problem of state of the art network systems is the perceived necessity to use shielded cable in order to preserve line quality and the quality of the transmission of the data so that breakup or loss of data would be minimized. Without amplification and other sophisticated cabling techniques specialized for each individual situation, it has been recommended that the use of standard flat multi-wire telephone type cable be limited to runs of 25 feet for use in a ground reference (non-differential) circuit. In laying out the state of the art connector type systems, special modules were utilized and special shielded cabling requiring a special plug was thought to be necessary to assure drop-out-free transmissions. Additionally, jumper boxes were required where, for instance, at a given station there was no applicable computer product. Thus, the Apple Talk cabling system is a serial only system which requires sophisticated hardware and a shielded cable, along with shielded connectors in order, it was thought, to transfer error-free data from one point to another.

It should be noted that, typically, the telephone cable runs throughout an office exceed 1,000 feet and often are as long as 5,000 feet. It was therefore thought that data transmission over standard telephone cables could not accommodate such long runs of cable without modem interconnection.

Other state of the art systems include coaxial cable linked systems of even greater cost and complexity, including, among others, the Xerox Corporation—licensed Ethernet ® system.

It is a principal object of the invention to provide a local area network (LAN) system and modular components therefor affording simple, effective, low cost interconnection among similar or diverse microcomputers and peripherals and over long running lengths of ordinary telephone cable, often sharing a building's existing cables with the telephone system.

SUMMARY OF THE INVENTION

The present invention meets the foregoing object by provision of a LAN modular system which uses for interconnects in-place telephone wires together with modular telephone connectors which are either already in place or easily installable. Rather than utilizing a special shielded system, it has been found that adequate communication among computer products (among micro-computers and/or their peripherals) can be achieved through the utilization of unshielded cable and a floating ground isolation circuit in which the impedance of the isolation transformer is minimized and appropriately coupled to, and constructed and arranged in relation to, the pulse modulation signal interface devices of the computer products, to achieve high detectability of the pulse edges of signal pulses and/or signal pulse groups. The invention features the production of significant passed-through signal pulses with a superimposed high frequency (relative to the pulse modulation rate of the signal) ringing characteristic at the leading edges of pulse and/or of inter-pulse dwell (i.e., the trailing edge of the pulse) to enhance signal detectability over long cable lengths notwithstanding degradation of the signal pulses. Wire lengths up to 3,000 feet, and up to 5,000 feet for larger gauge wires, may be used to connect computer products in a network. The ringing characteristic is originally produced in the interface transmission units of the computer products, e.g in accordance with IEEE-RS422 standard. The LAN also comprises surge suppression and static voltage drains on each line so that the floating ground loop defined by the LAN is safe Runs of up to 5,000 feet of cabling permit the system to be utilized throughout an office area without significant degradation of the signals passed between the various modules or units coupled to the line.

In addition to there being no need for the use of shielded cables or shielded connectors, the LAN of the present invention also permits the use of T and star topologies with large numbers of star branches, as illustrated in FIG. 7 (four branches), and the use of a bus topology with very long wire connections to the computer products and/or telephones, as illustrated in FIG. 5; daisy chain connections may also be used with the invention, without reconfiguring the module and without using switches, as illustrated in FIG. 5.

The transformer utilized in the LAN of the present invention is preferably one having a 50 picofarad or less, and more preferably 10 picofarad or less, interwinding capacitance, as compared to a 360 picofarad interwinding capacitance transformer used in the prior art common ground systems. The transformer is industrial (power) grade with a large inertial mass of its former or core to constitute a common mode line choxe, reducing line conducted interference (LCI) at 10 kHz or higher. Phone systems operate substantially below this threshold, typically rolling off above five kHz. The typical computer signals to be imposed on the line have modulation rates of $10^3$–$10^6$ baud (pulses per second). The use of only two wires to carry the network signals does not conflict with the two wires used for telephone tip and ring usage in the telephone cable; this permits the network to be run on the typically unused pair of wires in a building's four-conductor telephone cabling. The telephone and network can each operate undisturbed by utilizing selected pairs of wires within the standard telephone cable. Thus, telephone interconnects that were previously made are not affected by the utilization of the other of the pair of wires and the subject module containing the isolation transformer.

Termination resistors of 20–200 Ohms, preferably around 120 Ohms, are used in the LAN to significantly reduce electrical imbalances between the balanced pair in the phone wires and to reduce reflections at the ends of long runs and avoid phase summing collisions at T and star network connections of the LAN.

The foregoing structure has been found to provide a surprising response to the Quad driver-receiver circuits at the computer ends along the network, affording a significant ringing to maintain raised leading and trailing edge corners of pulses to enhance detection sensitivity. In addition to preserving this aid to detectability, the LAN of the present invention causes leading edges of pulses of signals passed through it to have an initial slower rise (droop) characteristic, thereby further suppressing spurious signal or noise pickup.

The combination of the foregoing features affords increased detection reliability over networks of substantially longer length (by orders of magnitude) compared to state of the art preceding this invention and enables beneficial use of installed public utility and private telephone network wiring. Regarding the latter feature, the relatively low grade of phone network cabling compared to typical dedicated computer network-wiring is accommodated by the robust network system of the present invention.

After setting up either a temporary or a permanent system, terminating resistors are utilized by adding them to the first and last wall boxes and at the center (See FIG. 7) of star connections of a large multi-user installation. This is easily done and, as mentioned before, the terminating resistors are typically 120 Ohms; this provides exceptionally good matching to standard modular telephone cabling. The utilization of the termination resistor beneficially reduces noise on the network. Its use loads the terminal ends and reduces reflections which cause noise.

In the present invention, utilization of a floating ground avoids questions relating to whether or not proper grounding is in fact attained in a nominally grounded installation with individual computers attached to different power circuits Rather than requiring coaxial cables or shielded pairs, the local area network of the present invention permits use of standard telephone cabling over distances greater by far than previously attained in any volume usage. Running a network without grounds and/or without shielding permits use of longer cable lengths and permits use of isolation transformers with less than 10 picofarad interwinding capacitance, rather than the prior art systems' 360 picofarads, to improve signal response.

The foregoing is explained in further detail and other objects, features, and advantages of the present invention will be apparent from the following detailed description of preferred embodiments thereof, taken in conjunction with the accompanying drawing.

BRIEF DESCRIPTION OF THE DRAWINGS

FIG. 5 is a schematic view of a typical network of devices that may be served by the invention using a bus topology and a daisy chain.

FIG. 6 is an isometric view of the RJ-11 modular connector that may be used in FIG. 4.

DETAILED DESCRIPTION OF PREFERRED EMBODIMENTS

Figure 1:
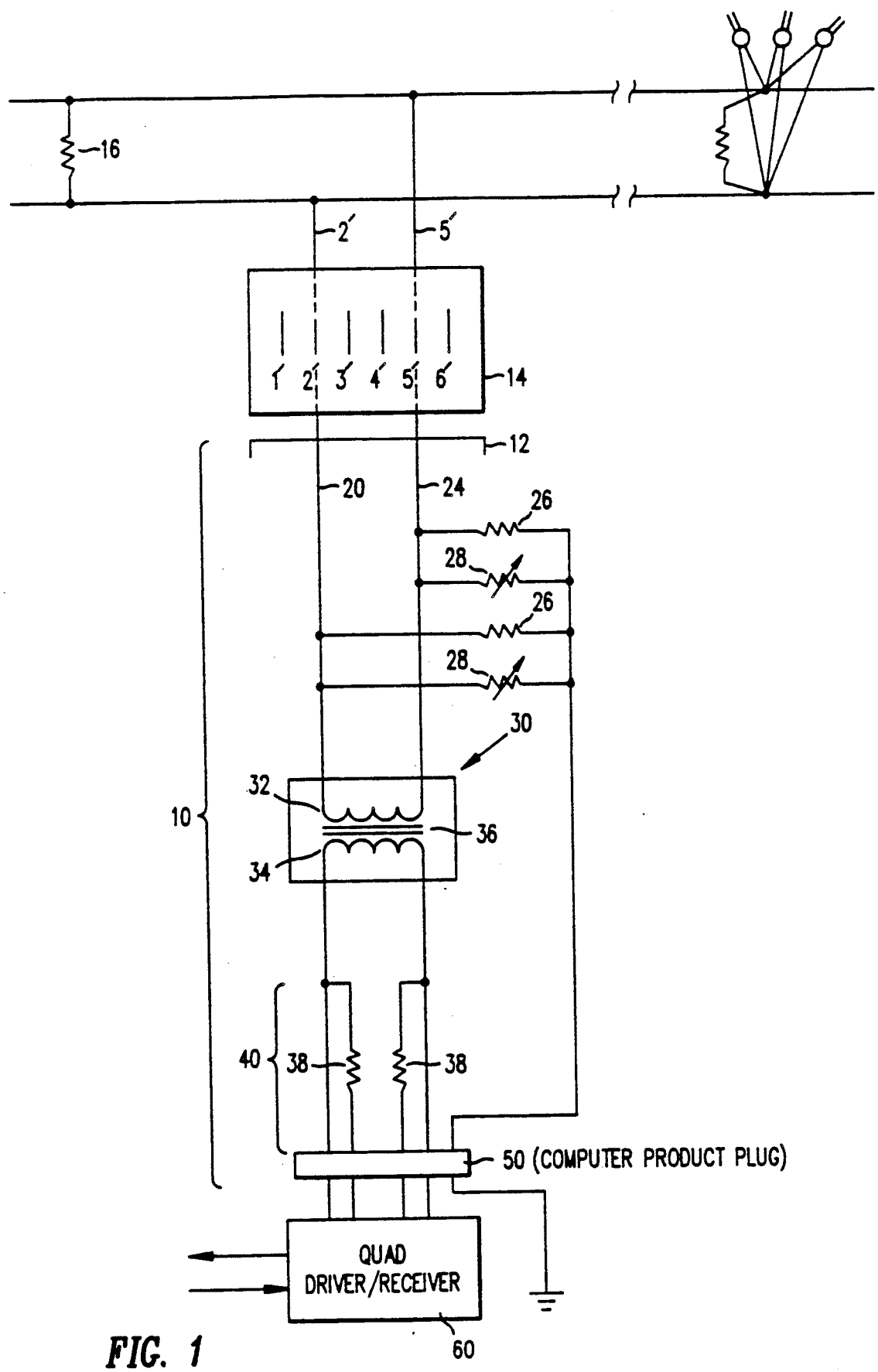
FIG. 1 is a schematic diagram of the principal elements of a network circuit established in accordance with a preferred embodiment of the invention.

Referring now to FIG. 1, there is shown a network according to a preferred embodiment of the invention incorporating a modular subassembly 10 including an RJ-11 standard connector 12 connectable to selected pins such as 2 and 5 of the "wall" portion of a phone system's portion 14 of the connector. The pins 2 and 5 are those leading to wires 2', 5' (i.e., yellow and black, respectively, under long-established U.S./AT&T standards), which are not part of the essential tip and ring signal wires of the telephone system (pins 3 and 4, red and green).

The subassembly 10 further includes a cable with leads 20, 24 to a transformer 30 with primary and secondary windings 32 and 34, respectively, positioned about a high mass metal former 36. A cable 40 leads to a plug 50 appropriate for the computer product, e.g., DB-9, DIN-8, or DE-25 among others.

The system includes a line termination resistor 16, e g., 120 Ohms, limiting line reflections. The system further includes high impedance (e.g., one Megohm) resistors 26 for draining static voltages and varistors 28 (zinc oxide resistors, e.g., Panasonic EZR-C05 Dk201) for shorting transient surges to ground, and balance resistors 38 as may be appropriate for the interface circuitry attached to plug end 50 as recommended by the manufacturer of such circuitry—typically one kilo-ohm resistance each to match any of the Am 26LS29-32 or similar Quad Driver/Receivers used in party line configuration producing (and detecting) differential signals from a balanced circuit (e.g., two wire pair).

The transformer 30 is typically a Coilcraft ™ P104—i.e., a 1.0:1.0 turns ratio transformer with 100–1000 turns in each of windings 32, 34 of 20-30 gauge wire about an E-form closed loop former of cross-section about equal to a winding loop cross-section, affording a high electromagnetic inertial mass and reducing conductive line interference. The interwinding capacitance of the transformer is very low, typically 7 pF, and the voltage isolation between windings is well over 350 volts, typically 3500 V-RMS, further isolating static charges on the network. The DC resistance of each of windings 32, 34 is under an Ohm, preferably 0.2 Ohms maximum.

Figure 2A:
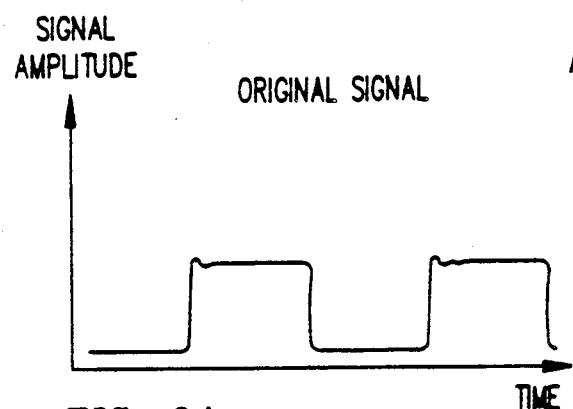
FIGS. 2A and 2B are, respectively, graphic views of the shape (voltage offset versus time) of a representative signal initiated and transmitted in a conventional system (2A) and in the network of FIG. 1 (2B).
Figure 2B:
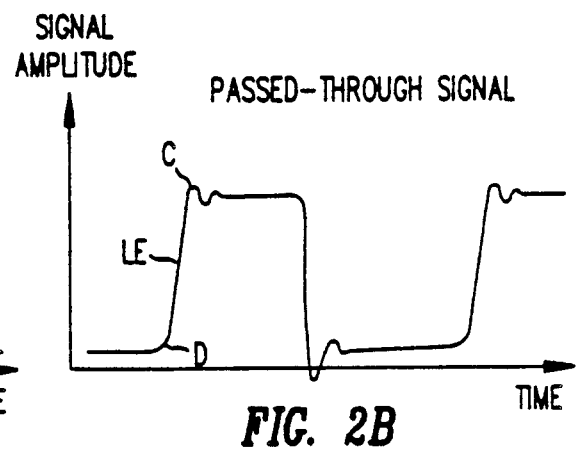

FIG. 2A shows a conventionally generated signal, with some ringing of its own apparent. FIG. 2B shows the signal generated by the network indicated in FIG. 1. At leading edge LE, a slight droop D appears with slower initial rise (reducing sensitivity to transient noise spikes). At the peak of the leading edge LE in FIG. 2B, a pronounced ringing appears, leading to a sharper corner C compared to prior art networks of the class involved here.

Figure 2C:
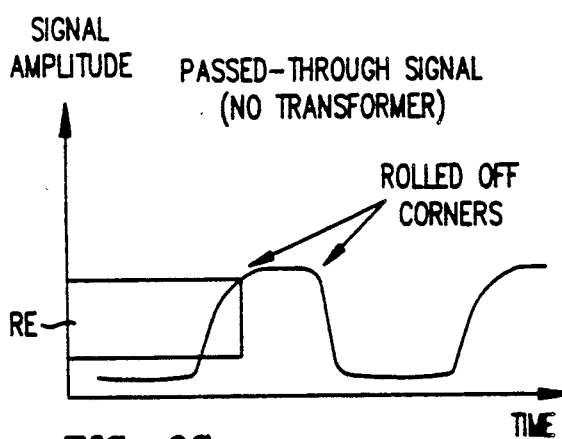
FIGS. 2C and 2D are, respectively, graphic views of the shape (voltage versus time) of the voltage signals of FIGS. 2A and 2B after these signals have been propagated a substantial distance (1000 feet or more) through the network.
Figure 2D:
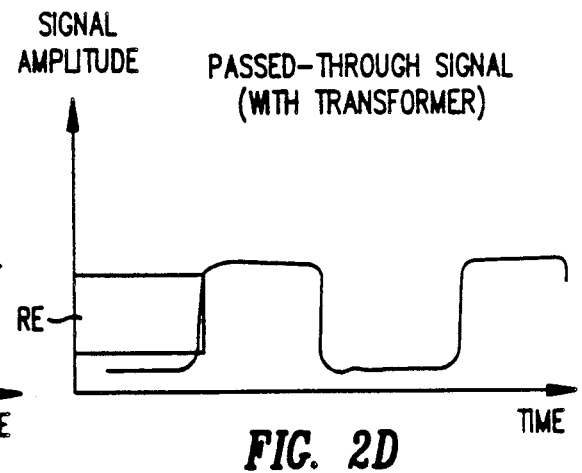

FIGS. 2C and 2D illustrate degradation of the pulse generated in FIGS. 2A and 2B, respectively, over a long (e.g., 1000 feet) cable run without and with, respectively, inclusion of the transformer 30 of FIG. 1. Sharpness of the leading edge LE is apparent relative to a reference envelope RE of rectangular form, the y-axis of which is voltage offset, the x-axis being time.

Figure 3:
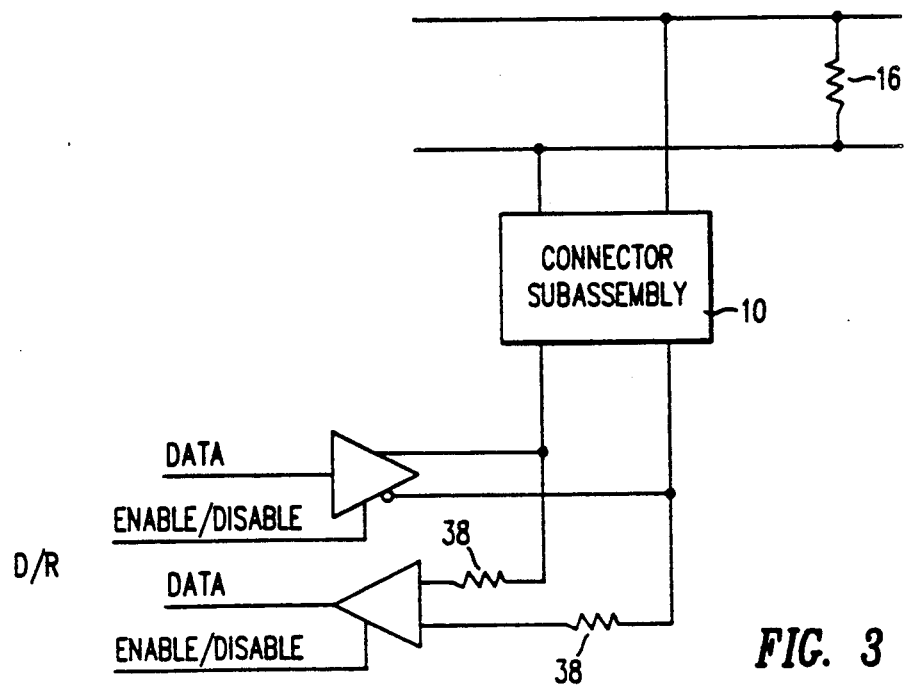
FIG. 3 is a schematic view of one module of a quad driver/receiver assembly that may be used in one embodiment of the invention.

FIG. 3 shows a party line configuration of a single module of the driver-receiver circuit D/R (which normally would be replicated several times).

Figure 4:
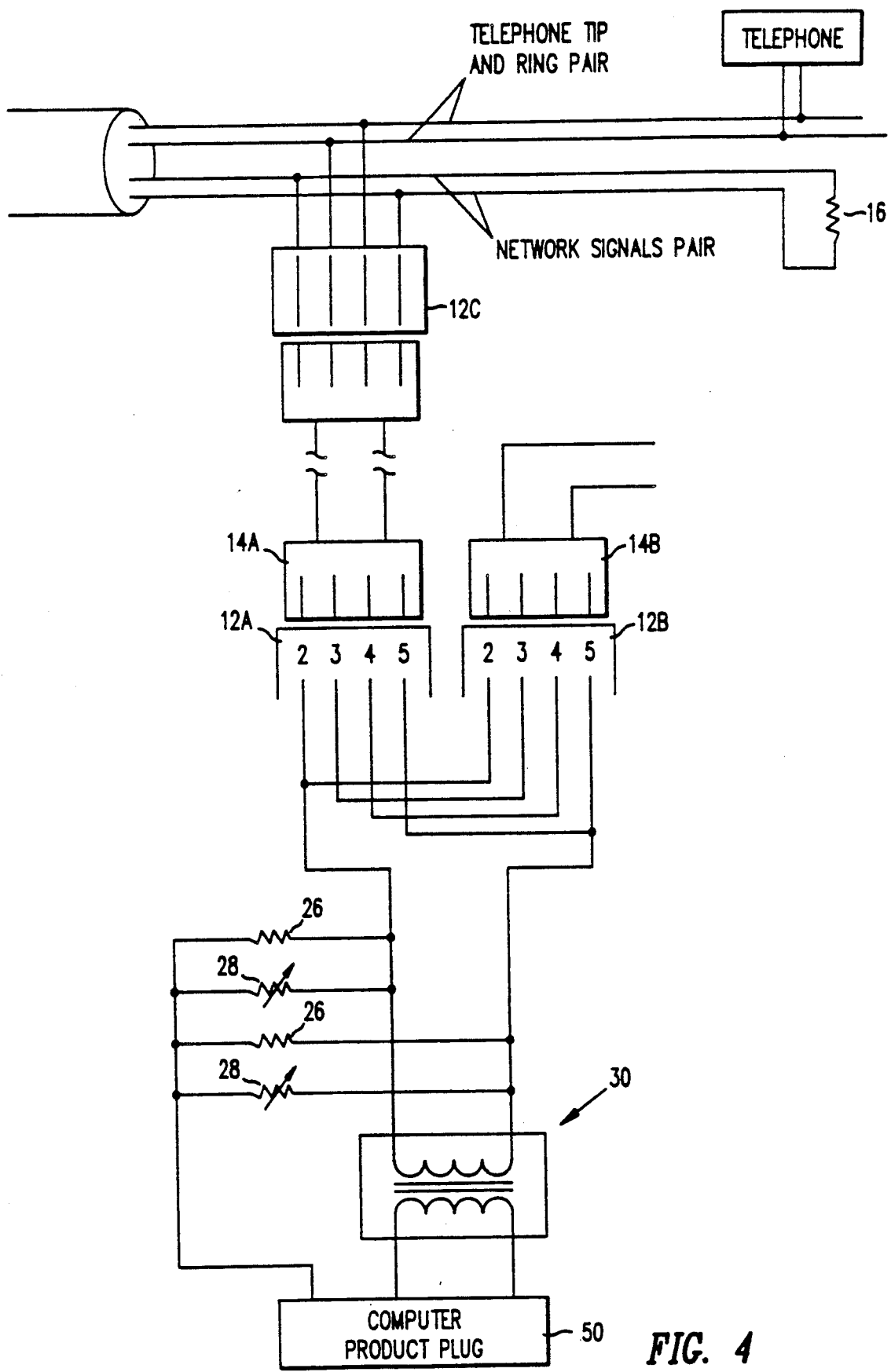
FIG. 4 is a more detailed schematic view of the interconnection of the modular system of FIG. 1, from the telephone line, to the transformer.

FIG. 4 shows schematically the modular system's interconnection via a dual RJ-11 modular connector 12A/12B/14A and single RJ-11 modular connector 12C linked by a single isolation transformer 30 to a plug 50 into a computer interface. A further modular connector male plug 14B could couple to 12B to continue a serial chain of computer products or link to a separate phone or PBX network. Each connector 12C thus allows two unshielded telephone-grade lines to be used to connect two or more computer products into a network and allows two (or more) other lines to be used for conventional telephone functions or other functions.

FIG. 5 illustrates a typical network of computer products using a bus topology (right hand portion, with each computer product being connected to the cable by a separate connector, where disconnection of any number of computer products does not disable the remaining network) and a stub with a daisy chain (left hand portion, connecting two or more computer products with a single connector 12C), utilizing an unused pair of lines in a telephone cable or similar lines to transport information with the invention. In a bus topology, each computer product or small cluster of such products is connected to the telephone cables through a separate connector a "stub"), as shown in FIG. 5; removal of a computer product or cluster and/or the associated connector does not affect communication among any of the remaining computer products in the network.

FIG. 6 is an isometric view of a case or container that can be used with the invention, showing a portion of an RJ-11 connector that may be used with the invention.

Figure 7:
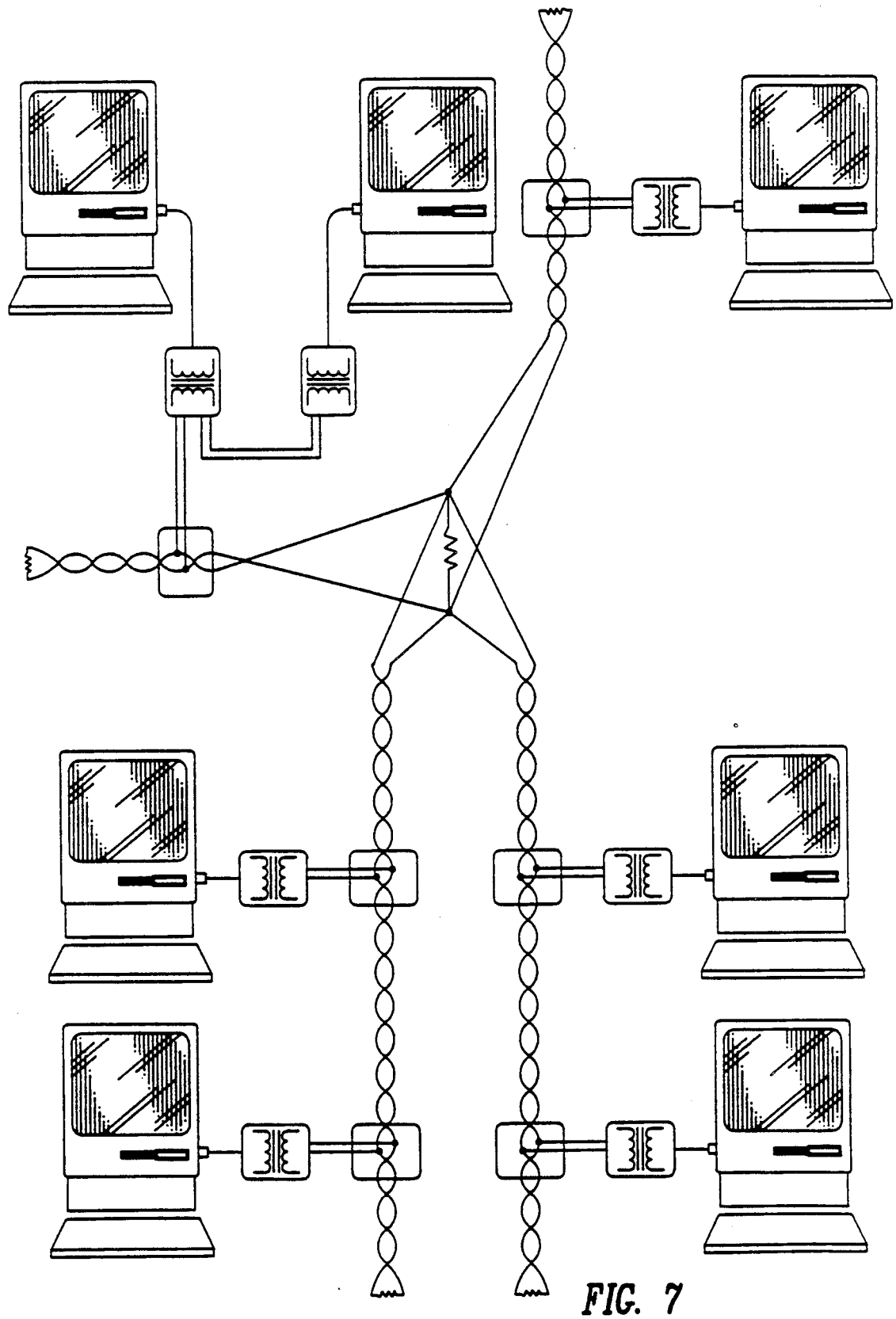
FIG. 7 is a schematic view illustrating the use of the invention in a network having a star topology with four branches.

FIG. 7 illustrates the use of the invention with a star topology (upper portion), with three or more branches (here, four) occurring in the information-carrying cable.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. A local area computer network for connecting a plurality of computer products, the network comprising:

a telephone cable containing four or more wires at least two of which are not used to transmit telephone signals, said telephone cable including at least two predetermined signal lines selected form the unused wires in the telephone cable that are unshielded and are used to transfer signals between computer products on the network while simultaneously allowing a telephone to use a remaining pair of wires in the telephone cable; and a connector associated with each computer product for connecting a computer product through the at least two predetermined signals lines to a second computer product for exchange of information between computer products in a network; wherein said connector comprises:

a first connection for receiving signals from and for passing signals to each of the two predetermined singal lines;

a second connection having at least two signal lines for connecting to a computer product for sending signals to, and for receiving signals from, said computer product according to the E.I.A. RS-422 standard; and means connected to the first connection for suppressing static that appears at the first connection and for transferring signals between the first and second connections.

2. A local area network connector for connecting a computer product to the signal lines in a local area network, comprising:

a first connection for receiving signals from and for passing signals to each of two signal lines in the local area network;

a second connection having at least two signal lines and being connectable to the computer product for sending signals to, and for receiving signals from, the computer product according to the E.I.A. RS-422 standard; and means connected to the first connection for suppressing static at the first connection and for allowing transfer of signals between the first and second connections.

3. A local area computer network for connecting a plurality of computer products, the network comprising:

a telephone cable containing four or more wires at least two of which are not used to transmit telephone signals, said telephone cable including at least two predetermined signal lines selected from the unused wires in the telephone cable that are unshielded and are used to transfer signals between computer products on the network while simultaneously allowing a telephone to use a remaining pair of wires in the telephone cable; and a connector associated with each computer product for connecting a computer product through the at least two predetermined signal lines to a second computer product for exchange of information between computer products in a network; wherein said connector comprises:

a first connection for receiving signals from and for passing signals to each of the two predetermined signal lines;

suppression means connected to the first interface means for limiting voltage surges and for suppressing static that appears tat the first connection;

a second connection having at least two signal lines for connecting to a computer product for sending signals to, and for receiving signals, from, said computer product according to the E.I.A. RS-422 standard; and an electrical isolator connected between the first connection and the second connection for transferring signals between the first and second connections.

4. A network according to claim 3, wherein said electrical isolator comprises a transformer with low interwinding capacitance and low interwinding ac resistance, having at least two primary terminals and at least two secondary terminals, with each primary terminal being connected to a separate one of said predetermined signal lines, and with each secondary terminal being connected to a separate one of said signal lines of said second connection.

5. A network, according to claim 4, wherein said transformer has interwinding capacitance of about 50 picofarads or less.

6. A network according to claim 4, wherein said transformer has intertwining ac resistance of substantially one Ohm or less.

7. A network according to claim 3, wherein said suppression means comprises two high impedance resistors, each connected at one end thereof to one of said predetermined signal lines, with the other end of each such resistor being connected substantially to ground, to suppress static appearing on one of said predetermined signal lines.

8. A network according to claim 4, wherein aid second connection comprises a bidirectional driver/receiver having at least six terminals, with first and second terminals thereof each being connected through an interface resistor to a separate one of said two secondary terminals of said transformer and being arranged to receive signals that are received by said transformer on said predetermines signal lines, with third and fourth terminals thereof each being connected to a separate one of said two secondary terminals of said transformer to transfer to said transformer, for receipt by said predetermined signal lines, signals that are receive by the driver/receiver from said computer product, with a fifth terminal thereof being connected to said computer product to transfer to said computer product any signal received by the driver/receive from said transformer, and with a sixth terminal thereof being connected to said computer product to transfer a signal from said computer product to the driver/receiver form said transformer.

9. A network according to claim 3, wherein said first connection includes a telephone modular connector.

10. A local area network connector for connecting a computer product to the signal lines in a local area network, comprising:

a first connection for receiving signals from and for passing signals to each of two signal lines in the local area network;

suppression means connected to the first connection for limiting voltage surges and for suppressing static that appears at the first connection;

a second connection having at least two signal lines and being connectable to the computer product for sending signals to, and for receiving signals from, the computer product according to the E.I.A. RS-422 standard; and an electrical isolator connected between the first connection and to the second connection for allowing transfer of signals between the first and second connections.

11. A connector according to claim 10, wherein the electrical isolator comprises a transformer with low interwinding capacitance and low interwinding A.C. resistance, having at least two primary terminals and at least tow secondary terminals, with each transformer primary terminal being connectable to a separate one of the signal lines, and with each secondary terminal being connectable to a separate one of the signal lines of the second interface means.

12. A connector according to claim 11, wherein the transformer has interwinding capacitance of about 50 picofarads or less.

13. A connector according to claim 11 wherein the transformer has intertwining A.C. resistance of substantially one Ohm or less.

14. A connector according to claim 10, wherein the suppression means comprises two high impedance resistors, each connectable at one end thereof to one o the signal lines, with the other end of each such resistor being connectable substantially to ground, to suppress static appearing on one of the signal lines.

15. A connector according to claim 11, wherein the second connection comprises a bidirectional driver/receiver having at least six terminals, with first and second terminals thereof each being connected through an interface resistor to a separate one of the two secondary terminals of the transformer and being arranged to receive signals that are received by the transformer on the signal lines, with third and fourth terminals thereof each being connected to a separate one of the two secondary terminals of the transformer to transfer to the transformer, for receipt by the signal lines, any signals that are received by the driver/receiver from the computer product, with a fifth terminal thereof being connectable to the computer product so as to transfer to the computer product any signal received by the driver/receiver form he transformer, and with a sixth terminal thereof being connectable to the computer product so as to transfer a signal from the computer product to the driver/receiver.

16. A connector according to claim 10, further including a third connection to connect a telephone to a telephone cable having at least four wires, wherein the two signal lines are in the telephone cable.

17. A connector according to claim 10, wherein the suppression means comprises two high impedance resistors, each connectable at one end thereof to one of the signal lines, with the other end of each such resistor being connectable substantially to ground.

18. A local area computer network for connecting a plurality of computer products, the network comprising:

a telephone cable containing four or more wires at least two of which are not used to transmit telephone signals, said telephone cable including at least two predetermined signal lines elected from the unused wires in the telephone cable that are unshielded and are used to transfer signals between computer products on the network while simultaneously allowing a telephone to use a remaining pair of wires in the telephone cable; and a connector associated with each computer product for connecting a computer product through the at least two predetermined signal lines to a second computer product for exchange of information between computer products in a network; wherein said connector comprises:

a first connection for receiving signals from and for passing signals to each of the two predetermined signal lines;

suppression means connected to the first connection for suppressing static that appears at the first connection;

a second connection having at least two signal lines for connecting to a computer product for sending signals to, and for receiving signals from, said computer product according to the E.I.A. RS-422 standard; and an electrical isolator connected between the first connection and the second connection for transferring signals between the first and second connections.

19. A network according to claim 18, wherein said suppression means comprises two high impedance resistors, each connected at one end thereof to one of said predetermined signal lines, with the other end of each such resistor being connected substantially to ground.

20. A local area network connector for connecting a computer product to the signal lines in a local area network, comprising:

a first connection for receiving signals from and for passing signals to each of two signal lines in the local area network;

suppression means connected to the first connection for suppressing static that appears at the first connection;

a second connection having at least two signal lines and being connectable to the computer product for sending signals to, and for receiving signals from , the computer product according to the E.I.A. RS-422 standard; and an electrical isolator connected between the first connection and the second connection for allowing transfer of signals between the first and second connections.

* * * * *

UNITED STATES PATENT AND TRADEMARK OFFICE
CERTIFICATE OF CORRECTION

PATENT NO.    :   5,003,579
DATED         :   March 26, 1991
INVENTOR(S)   :   Reese M. Jones It is certified that error appears in the above-identified patent and that said Letters Patent is hereby corrected as shown below:

Column 1, line 8, after "1988," insert --now U.S. Patent 4,901,342,--.

Column 1, line 39, after "together" insert --.--.

Column 3, line 35, after "safe" insert --.--.

Column 3, line 57, delete "choxe" and insert --choke--.

Column 8, line 34, delete "predetermines" and insert --predetermined--.

Column 9, line 3, delete "tow" and insert --two--.

Column 9, line 16, delete "o" and insert --of--.

Column 9, line 35, delete "form he" and insert --from the--.

UNITED STATES PATENT AND TRADEMARK OFFICE
CERTIFICATE OF CORRECTION

PATENT NO. : 5,003,579
DATED : March 26, 1991
INVENTOR(S) : Reese M. Jones

It is certified that error appears in the above-identified patent and that said Letters Patent is hereby corrected as shown below:

On the title page: Item [56]
Under "OTHER PUBLICATIONS", please add:

"PhoneNet Snares Growing Number of Networks", Infoworld, March 16, 1987.

"Network Links Vendor's Exhibits", Infoworld, February 2, 1987.

"PhoneNet", MacWeek, September 8, 1987.

"Agenda Focus on Farallon", January 15-17, 1988.

"PhoneNet System Network Management Software", Farallon Computing, 1988.

"PhoneNet Star Controller", Farallon Computing, 1988.

"Party Line", MacUser, December 1986.

"PhoneNet Star Controller Tech Notes", Farallon Computing, 1987.

"TOPS Links Mac and PC Files", PC Magazine, January 13, 1987.

"StarCommand Desk Accessory Tech Notes", Farallon Computing, 1987.

"MacRecorder Sound System", Farallon Computing, 1988.

"Add Sound to Hypercard", Farallon Computing, 1987.

UNITED STATES PATENT AND TRADEMARK OFFICE
CERTIFICATE OF CORRECTION

PATENT NO.   :   5,003,579
DATED        :   March 26, 1991
INVENTOR(S)  :   Reese M. Jones It is certified that error appears in the above-identified patent and that said Letters Patent is hereby corrected as shown below:

Under "OTHER PUBLICATIONS", please add:

"Appletalk for the rest of us", Reese Jones, The Fall 1985 BMUG Newsletter, pages 75-82.

"Deeper Inside Apple Talk", Hal Adkins, The Fall 1985 BMUG Newsletter, pages 82-83.

"Installing a PhoneNet Network", Reese Jones, Spring 1986 BMUG Newsletter, pages 43-54.

"About the PhoneNet System", September 1987, Farallon Computing, 12 unnumbered pages.

Literature on TOPS Teleconnector, 1987, 6 unnumbered pages.

"PhoneNet Plus Connectors", Farallon Computing, 1988, 2 pages.

"Overview of PhoneNet System", Farallon Computing, 1988, 2 pages.

"Farallon Product Description", Farallon Computing, 1987, 5 unnumbered pages.

"AppleTalk Developers and Products", Farallon Computing, 1987, 6 unnumbered pages.

"PhoneNet", The Macintosh Journal, November 1986.

"Firm to Sell Appletalk Controller", Infoworld, December 16, 1986.

UNITED STATES PATENT AND TRADEMARK OFFICE
CERTIFICATE OF CORRECTION

PATENT NO.    :   5,003,579
DATED         :   March 26, 1991
INVENTOR(S)   :   Reese M. Jones It is certified that error appears in the above-identified patent and that said Letters Patent is hereby corrected as shown below:

Under "OTHER PUBLICATIONS", please add:

"AppleTalk Over Telephone Wire?", Farallon Computing, 1987.

"PhoneNet System Topology Guide", Farallon Computing, 1988.

PhoneNet User's Guide, Farallon Computing, 1986, 1987.

"Extending Ethernet Systems", Micro/Systems Journal, January 1988, pages 26-40.

"The Transformer", Scientific American, undated, pages 86-112.

Signed and Sealed this

Eighteenth Day of January, 1994

Attest:

BRUCE LEHMAN

Attesting Officer           Commissioner of Patents and Trademarks